United States Patent
Albrecht

(10) Patent No.: US 7,328,936 B2
(45) Date of Patent: Feb. 12, 2008

(54) WIND STOP DEVICE

(75) Inventor: Björn Albrecht, Meine (DE)

(73) Assignee: Volkswagen AG, Wolfsburg (DE)

( * ) Notice: Subject to any disclaimer, the term of this patent is extended or adjusted under 35 U.S.C. 154(b) by 120 days.

(21) Appl. No.: 11/316,016

(22) Filed: Dec. 22, 2005

(65) Prior Publication Data

US 2006/0208532 A1  Sep. 21, 2006

(30) Foreign Application Priority Data

Dec. 22, 2004  (DE) .................... 10 2004 061 758

(51) Int. Cl.
*B60J 1/20* (2006.01)
(52) U.S. Cl. .................................. 296/180.1
(58) Field of Classification Search ........... 296/180.1, 296/180.2
See application file for complete search history.

(56) References Cited

U.S. PATENT DOCUMENTS

| | | | | |
|---|---|---|---|---|
| 5,195,799 A * | 3/1993 | Gotz et al. | ............... | 296/180.1 |
| 5,211,718 A * | 5/1993 | Gotz et al. | ............... | 296/180.1 |
| 5,318,337 A * | 6/1994 | Gotz et al. | ............... | 296/180.5 |
| 5,738,404 A | 4/1998 | Stadler et al. | | |
| 6,554,349 B2 * | 4/2003 | Gloss | ............... | 296/180.1 |
| 6,557,928 B2 * | 5/2003 | Dreher et al. | ............ | 296/180.1 |
| 6,582,008 B2 | 6/2003 | Maeurle et al. | | |
| 6,692,063 B2 * | 2/2004 | Dreher et al. | ............ | 296/180.1 |
| 6,926,062 B2 * | 8/2005 | Neumann et al. | ........... | 160/371 |
| 7,226,118 B2 * | 6/2007 | Kreis et al. | ............. | 296/180.1 |
| 2001/0034169 A1 | 10/2001 | Goetz et al. | | |
| 2002/0089214 A1 * | 7/2002 | Gloss | ............... | 296/180.1 |
| 2002/0096911 A1 | 7/2002 | Maeurle et al. | | |
| 2002/0105208 A1 * | 8/2002 | Dreher et al. | ............ | 296/180.1 |
| 2003/0205912 A1 * | 11/2003 | Dreher et al. | ............ | 296/180.1 |

FOREIGN PATENT DOCUMENTS

| | | |
|---|---|---|
| DE | G 88 12 257.3 U1 | 2/1989 |
| DE | 38 44 844 C2 | 6/1989 |
| DE | 39 23 558 A1 | 3/1990 |
| DE | 195 45 405 A1 | 6/1997 |
| DE | 196 16 448 A1 | 11/1997 |
| DE | 100 53 701 A1 | 5/2002 |
| EP | 0 361 624 A1 | 4/1990 |
| EP | 1 134 106 A2 | 9/2001 |
| EP | 1 202 475 A2 | 5/2002 |
| WO | WO 90/03286 | 4/1990 |

* cited by examiner

*Primary Examiner*—H Gutman
(74) *Attorney, Agent, or Firm*—Manfred Beck, P.A.

(57) ABSTRACT

A wind stop device, in particular for a convertible, includes a multi-part wind partition and a multi-part cover partition. A left and a right cover partition part can be folded about a cover partition folding axis and at the same time a left and a right wind partition part can be folded about a respective first and second wind partition folding axis from a non-use position into a cover position for covering a passenger compartment. The left and right wind partition parts and a middle wind partition part, which is provided between the first and second wind partition folding axes, can be folded about a connection folding axis, which extends perpendicular to a direction of travel, into a use position such that the wind partition parts are substantially perpendicular to the cover partition parts.

13 Claims, 5 Drawing Sheets

WIND STOP DEVICE

BACKGROUND OF THE INVENTION

Field of the Invention

The invention relates to a wind stop device having a multi-part wind partition and a multi-part cover partition.

Wind deflectors or wind partitions which can be installed are generally known for convertibles. German Patent No. DE 38 44 844 C3 discloses a wind protection for convertibles which is arranged behind a row of seats. The wind protection for convertibles is formed with a first, upright part extending upward beyond the seats and extending across the entire width of the vehicle interior space. The first, upright part of the wind protection ends with its bottom edge about level with the edge of the passenger compartment and from there the wind protection transitions into a substantially horizontal part extending rearward and covering an opening behind the seats. The two parts of the wind protection are connected via hinges and each part is formed by a flexible netting stretched out in a frame. The first, upright part of the wind protection can be swung backward into a resting position such that it rests on the second, horizontal part.

Published, Non-Prosecuted German Patent Application DE 195 45 405 A1 describes a wind deflector or wind partition for a convertible that is arranged behind a row of seats and that has an upright part extending upwards beyond the seats and extending across the entire width of the vehicle interior space when in its effective position. The bottom edge of the upright part ends substantially level with a waistline of the vehicle. There, the upright part is connected via hinges to a substantially horizontal part which covers an opening behind the seats from above. The first part is formed by a flexible netting stretched out by a frame whereas the second part is configured as a plate-shaped cover.

Using the above-described conventional wind stop devices as a starting point, newer wind deflectors or wind stopping devices have been developed. Published, Non-Prosecuted German Patent Application No. DE 196 16 448 A1 describes a wind partition for a convertible having a cover which, in its mounted state, horizontally covers a rear passenger compartment and having a wind partition frame extending substantially across the width of the passenger compartment, A substantially two-dimensional structure spans the entire area bounded by the wind partition frame wherein the cover and the wind partition frame are pivotably connected to one another along a common folding axis. The cover as well as the wind partition frame are divided into several parts along axes that are perpendicular with respect to the common folding axis. In this case, at least parts of the wind partition frame are connected via at least one hinge configuration to one another. A disadvantage is in this case that locking devices for an erected functional position of the wind partition are assigned to the parts of the cover as well as the parts of the wind partition frame that provide a locking in the erected functional position. In order to be able to fold the entire wind partition to half of its width it is necessary to release at least one lock at the bottom side of the cover parts.

A further wind stop device is known from Published, Non-Prosecuted German Patent Application DE 100 53 701 A1 and European Patent Application EP 1 202 475 A2. The wind stop device disclosed there includes a wind partition which is formed by two wind partition parts. The two wind partition parts can be folded about a wind partition folding axis for bringing them from a spread-out position, in which the wind partition extends with its maximum extension in a direction of expansion, into a folded-up position, in which the two wind partition parts are placed essentially on top of one another. The wind stop device further includes a cover for a portion of an opening of the passenger compartment. The cover is formed by two cover parts and is connected to the wind partition. The cover parts are mounted pivotably on one another and can pivot about a cover folding axis. The cover parts can be brought from a spread out position, in which the cover extends with its maximum extension in a direction of expansion, into a folded-up position. In this position, the cover parts essentially rest on top of one another, wherein, in a functional position, the wind partition and the cover are connected to one another at least by a connection between one wind partition part with that cover part that is adjacent to the wind partition part. This solution makes it possible that the wind partition can be folded in a direction toward the cover even when the wind partition is in a spread out position in order to place the wind partition on the cover. However, there is the disadvantage that in order to further fold up the wind stop device, it is necessary to release the releasable connection between at least one of the wind partition parts with the cover part that is adjacent to this wind partition part in order to fold up the wind partition part that has been released and, respectively, the cover part.

SUMMARY OF THE INVENTION

It is accordingly an object of the invention to provide a wind stop device which overcomes the above-mentioned disadvantages of the heretofore-known wind stop devices of this general type and which can be folded up conveniently and compactly, in particular without requiring that additional connections have to be made or released when mounting or dismounting the wind stop device.

With the foregoing and other objects in view there is provided, in accordance with the invention, a wind stop device, including:

a multi-part wind partition having wind partition parts including a left wind partition part, a right wind partition part, and a middle wind partition part;

a multi-part cover partition having cover partition parts including a left cover partition part and a right cover partition part;

the multi-part wind partition defining a first wind partition folding axis and a second wind partition folding axis, the middle wind partition part being provided between the first wind partition folding axis and the second wind partition folding axis;

the multi-part cover partition defining a cover partition folding axis;

the left cover partition part and the right cover partition part being foldable about the cover partition folding axis and simultaneously the left wind partition part being foldable about the first wind partition folding axis and the right wind partition part being foldable about the second wind partition folding axis from a non-use position into a covering position;

the wind partition parts and the cover partition parts being in a folded-up position and substantially resting against one another when in the non-use position and being configured to substantially horizontally cover a portion of a passenger compartment when in the covering position; and the wind partition parts defining a connection folding axis transverse to a direction of travel, the left wind partition part, the right wind partition part, and the middle wind partition part being foldable from the covering position into a use position by folding the left wind partition part, the right wind partition part, and the middle wind partition part together about the connection folding axis such that the wind partition parts are substantially perpendicular with respect to the cover partition parts, at least one of the wind partition parts and the cover partition parts being configured to be connected to a chassis when in the use position.

In other words, according to the invention, there is provided a wind stop device, in particular for a convertible, that essentially includes a multi-part wind partition and a multi-part cover partition, wherein the multi-part wind partition is pivotable about at least one wind partition folding axis and the multi-part cover partition is pivotable about at least one cover partition folding axis such that the multi-part wind partition and the multi-part cover partition can be brought from a non-use position, in which the wind partition parts and the cover partition parts are in a folded-up position resting against one another, into a use position, in which the wind stop device is connected to a chassis and in which the cover partition parts, which are folded about the at least one cover partition folding axis, and the wind partition parts, which are folded about the at least one wind partition folding axis, horizontally cover a portion of the passenger compartment and the wind partition parts can be erected essentially perpendicular with respect to the cover partition parts by folding them about a connection folding axis transverse to a direction of travel, wherein a left and a right cover partition part can be folded about the at least one cover partition folding axis and at the same time a left and a right wind partition part can be folded about an associated first an second wind partition folding axis from a non-use position in a cover position in a position covering the passenger compartment and from which position the left and right wind partition part and a middle wind partition part, which is formed between the first and second wind partition folding axis, can be folded about the connection folding axis into the use position.

According to a feature of the invention, the wind partition parts surround the cover partition parts when the wind partition parts and the cover partition parts are in the non-use position.

According to another feature of the invention, there is provided a first hinge, a second hinge, a third hinge, a fourth hinge, and a fifth hinge; the first hinge, the second hinge, and the third hinge together forming a triple hinge; the second hinge and the fourth hinge being provided for folding the left wind partition part from the non-use position to the covering position about the first wind partition folding axis; and the third hinge and the fifth hinge being provided for folding the right wind partition part from the non-use position to the covering position about the second wind partition folding axis.

According to a further feature of the invention, the first, second, third, fourth and fifth hinge are pivot hinges.

According to another feature of the invention, the first hinge is provided for folding the left wind partition part, the right wind partition part, and the middle wind partition part together about the connection folding axis.

According to yet a further feature of the invention, the left cover partition part has left cover partition frame parts including a left middle cover partition frame part; the right cover partition part has right cover partition frame parts including a right middle cover partition frame part; and the left middle cover partition frame part and the right middle cover partition frame part are formed as corner profiles with respective surfaces facing one another and substantially resting against one another in the covering position and in the use position such that the corner profiles provide a self-holding effect for the left cover partition part and the right cover partition part along the cover partition folding axis.

According to another feature of the invention, the left wind partition part includes left wind partition frame parts and the right wind partition part includes right wind partition frame parts.

According to yet another feature of the invention, the middle wind partition part is bounded by the first wind partition folding axis, the second wind partition folding axis, the second hinge, the third hinge, the fourth hinge, and the fifth hinge.

According to another feature of the invention, there is provided a left connecting and fastening element and a right connecting and fastening element foldably connecting the multi-part wind partition and the multi-part cover partition to one another when in the non-use position, in the covering position, and in the use position; the left connecting and fastening element and the right connecting and fastening element being configured to connect at least one of the multi-part wind partition and the multi-part cover partition to the chassis when in the covering position and in the use position; and the left connecting and fastening element and the right connecting and fastening element each having a bolt, a guide, a spring element, an eye, an actuating element, and a mount for the actuating element.

According to a further feature of the invention, the left connecting and fastening element and the right connecting and fastening element each further have a connecting element; the left cover partition part has a left lower cover partition frame part and the right cover partition part has a right lower cover partition frame part; and the bolt is guided in the guide, in the eye, and in the connecting element substantially in extension of the left lower cover partition frame part and, respectively, in extension of the right lower cover partition frame part.

According to still a further feature of the invention, the left cover partition part and the right cover partition part each have a respective lower cover partition frame part; and the guide is connected to the lower cover partition frame part.

According to another feature of the invention, the left cover partition part and the right cover partition part each have a respective lower cover partition frame part; and the eye is connected to the lower cover partition frame part.

With the foregoing and other objects in view there is provided, in accordance with the invention, in combination with a convertible having a chassis with a passenger compartment, a wind stop device, including:

a multi-part wind partition having wind partition parts including a left wind partition part, a right wind partition part, and a middle wind partition part;

a multi-part cover partition having cover partition parts including a left cover partition part and a right cover partition part;

the multi-part wind partition defining a first wind partition folding axis and a second wind partition folding axis, the middle wind partition part being provided between the first wind partition folding axis and the second wind partition folding axis;

the multi-part cover partition defining a cover partition folding axis;

the left cover partition part and the right cover partition part being foldable about the cover partition folding axis and simultaneously the left wind partition part being foldable about the first wind partition folding axis and the right wind partition part being foldable about the second wind partition folding axis from a non-use position into a covering position;

the wind partition parts and the cover partition parts being in a folded-up position and substantially resting against one another when in the non-use position and being configured to substantially horizontally cover a portion of the passenger compartment when in the covering position; and the wind partition parts defining a connection folding axis transverse to a direction of travel of the convertible, the left wind partition part, the right wind partition part, and the middle wind partition part being foldable from the covering position into a use position by folding the left wind partition part, the right wind partition part, and the middle wind partition part together about the connection folding axis such that the wind partition parts are substantially perpendicular with respect to the cover partition parts, at least one of the wind partition parts and the cover partition parts being configured to be connected to the chassis when in the use position.

In a preferred embodiment of the wind stop device according to the invention, the cover partition parts, i.e. the left and the right cover partition part, are surrounded by the left and the right wind partition parts when in the non-use position. Additionally, a middle wind partition part surrounds the left and the right cover partition part at least on an end side thereof.

In a further preferred embodiment, the wind stop device can first be transferred from its non-use position into a covering position. The folding or pivoting of the right and the left wind partition parts from the non-use position into the covering position is done with respect to the cover partition parts about the cover partition folding axis and with respect to the wind partition parts about the first and the second wind partition folding axis. In order to provide the connection between the wind partition parts and the cover partition parts, a first pivot hinge is provided along the cover partition folding axis, wherein the first pivot hinge is part of a triple hinge. The triple hinge is made complete by a second and a third pivot hinge. A fourth and a fifth pivot hinge is provided along the first and, respectively, second wind partition folding axis opposite the second and, respectively, the third pivot hinge for folding the left and, respectively, the right wind partition part. Thus, the triple hinge is formed in the region of the connection folding axis between the cover partition parts and the wind partition parts and a double hinge is formed in the upper region of the wind partition.

The left, middle, and right wind partition parts as well as the left and the right cover partition part are respectively formed by corresponding cover partition frame parts and wind partition frame parts.

It is preferred that, in the covering position when folded about the cover partition folding axis and in the later use position when the wind partition is folded essentially vertically, a corner profile type shape of at least the left middle and the right middle cover partition frame causes a self-holding effect of the left and the right cover partition parts along the cover partition folding axis by surfaces of the corner profile which face one another and rest flat against each other. When the wind stop device in its covering position or use position is fastened at the chassis, the shape of the profiles of the middle cover partition frame ensures that the cover partition parts and, if applicable, the wind partition parts resting thereon in the covering position, do not sag and thus a stable surface is created. The wind stop device is configured such that, when taking into account the possible covering position, also the weight of the wind partition parts can be absorbed by the self-holding effect of the cover partition parts. According to a preferred embodiment of the invention it is not absolutely necessary that all frame parts of the cover partition parts or of the wind partition parts are provided in this corner profile shaped configuration which creates this self-holding effect.

According to another preferred embodiment, a connecting and fastening element is provided, which fastens the wind stop device to the chassis and which, by using a connecting part, connects the wind partition and the cover partition to one another for a reversible folding between the covering position and the use position. The connecting part of the connecting and fastening element is in this case provided along the connection folding axis between the wind partition and the cover partition.

Other features which are considered as characteristic for the invention and which result in further preferred embodiments of the invention are set forth in the appended claims. Details with respect to the configuration of the triple hinge between the cover partition part and the wind partition part as well as the double hinge at the wind partition part and the self-holding effect of the cover partition part are explained in depth in the description of the preferred embodiments. The configuration of the frame parts of the wind partition as well as the connecting and fastening element between the wind stop device and the chassis is also explained in depth in the description of the preferred embodiments.

Although the invention is illustrated and described herein as embodied in a wind stop device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
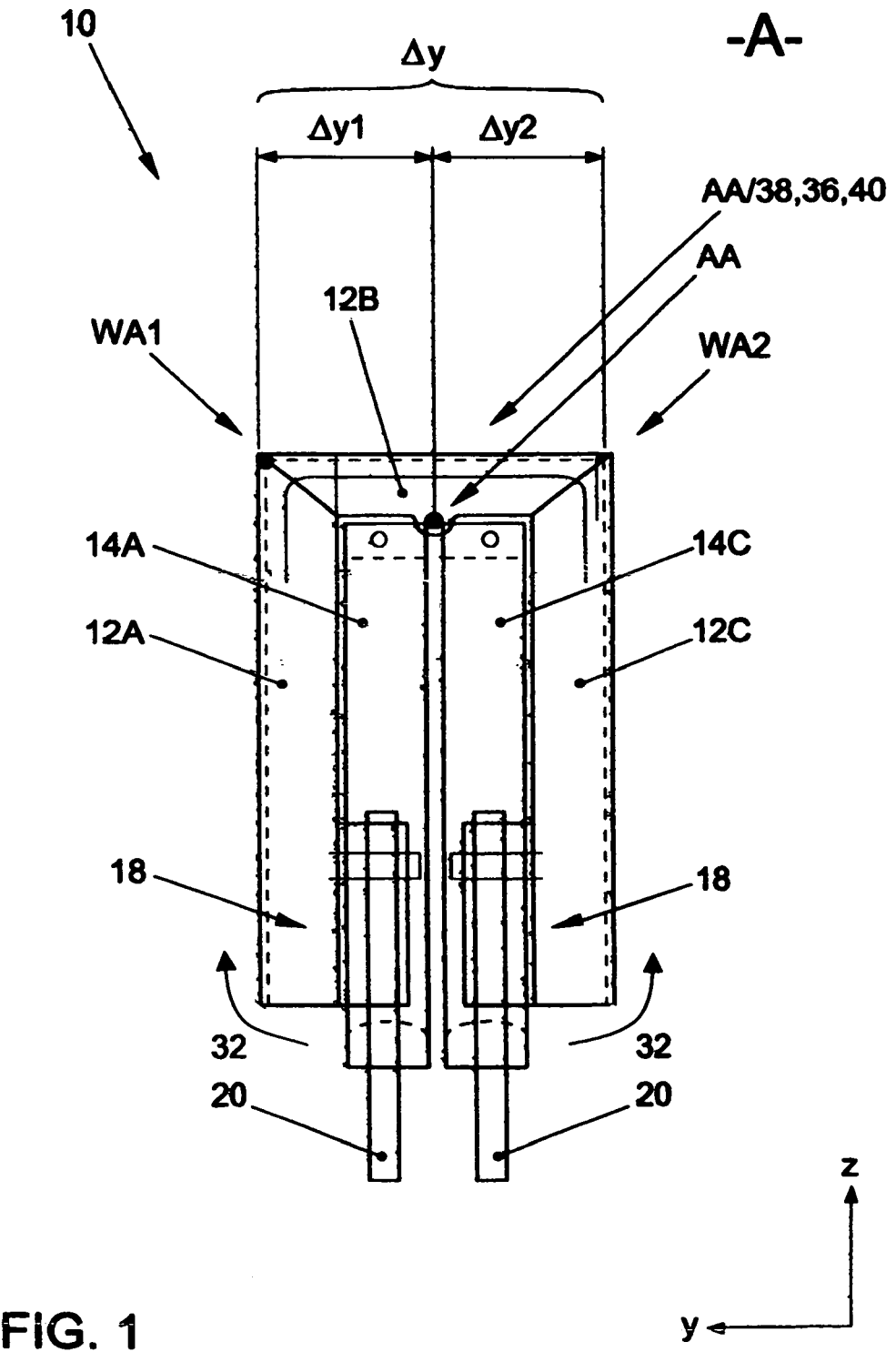
FIG. 1 is a diagrammatic sectional view of a wind stop device according to the invention in a non-use position A.

Referring now to the figures of the drawings in detail and first, particularly, to FIG. 1 thereof, there is shown a section of a wind stop device 10 in a non-use position A. The wind stop device 10 includes a left wind partition part 12A, a middle wind partition part 12B, and a right wind partition part 12C. The wind stop device 10 further has a left and a right cover partition part 14A, 14C which are disposed on the inside when in the non-use position A. The wind partition parts 12A, 12B, 12C surround the cover partition parts 14A, 14C wherein the middle wind partition part 12B forms, on one side, a face side of the wind stop device 10. Opposite the face side, the sectional view shows connecting and fastening elements 18 which are used for connecting the left wind partition part 12A and the left cover partition part 14A as well as the right wind partition part 12C and the right cover partition part 14C to one another and, at the same time, are used for fastening the wind stop device via bolts 20 in a chassis 16.

The wind stop device 10 has a cover partition folding axis AA and a first wind partition folding axis WA1 as well as a second wind partition folding axis WA2 for performing a first reversible unfolding movement 32. The sectional view shows a distance of the two wind partition folding axes Δy, wherein the sum of the distances Δy1, which is the first wind partition folding axis distance between the first wind partition folding axis WA1 and the cover partition folding axis AA, and Δy2, which is the second wind partition folding axis distance between the second wind partition folding axis WA2 and the cover partition folding axis AA, is shown. FIG. 1 further shows a triple hinge which includes a first, a second, and a third hinge 36, 38, 40. The first pivot hinge 36 of the triple hinge is provided on the cover partition folding axis AA, wherein the second pivot hinge 38 is provided on the first wind partition folding axis WA1 and the third pivot hinge 40 is provided on the second wind partition folding axis WA2.

Figure 2:
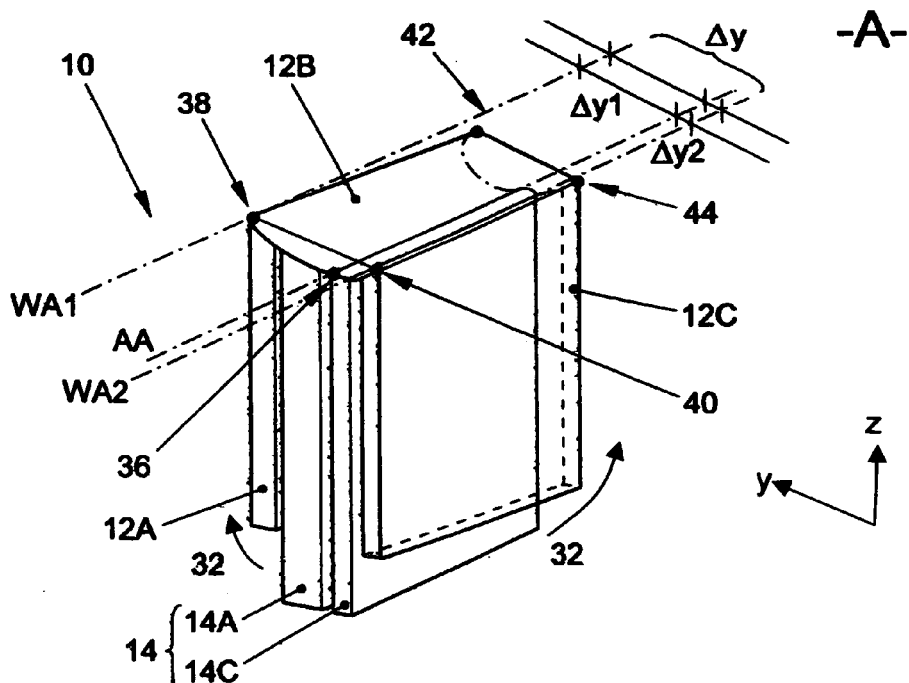
FIG. 2 is a diagrammatic perspective view of the wind stop device according to the invention in the non-use position A.

Further, according to FIG. 2, a fourth pivot hinge 42 is provided along the first wind partition folding axis WA1 next to the second pivot hinge 38 and a fifth pivot hinge 44 is provided on the second wind partition folding axis WA2 next to the third pivot hinge 40. The triple hinge 36, 38, 40 is provided in the lower region of the wind partition 12 at the junction point to the cover partition 14. The double hinge, which is formed by the fourth and the fifth pivot hinge 42, 44 and which is disposed on the wind partition folding axes WA1 and WA2, is disposed in the upper region of the wind partition 12 and opposite to the triple hinge 36, 38, 40.

FIG. 2 shows a perspective view of the wind stop device 10 which, in accordance to what is shown in FIG. 1, is likewise in the non-use position A. The first unfolding movement 32 is performed by folding the wind partition 12A, 12B about the first, and respectively, the second wind partition folding axis WA1, WA2 and by folding the cover partitions 14A, 14C about the cover partition folding axis AA, as is indicated by the arrows shown in FIG. 2.

The cover partition folding axis AA is provided with respect to the wind partition folding axes WA1, WA2 at the wind partition folding axis distance Δy1, Δy2 in the y-direction and in the z-direction (vertically) below the wind partition folding axes WA1, WA2.

Figure 3:
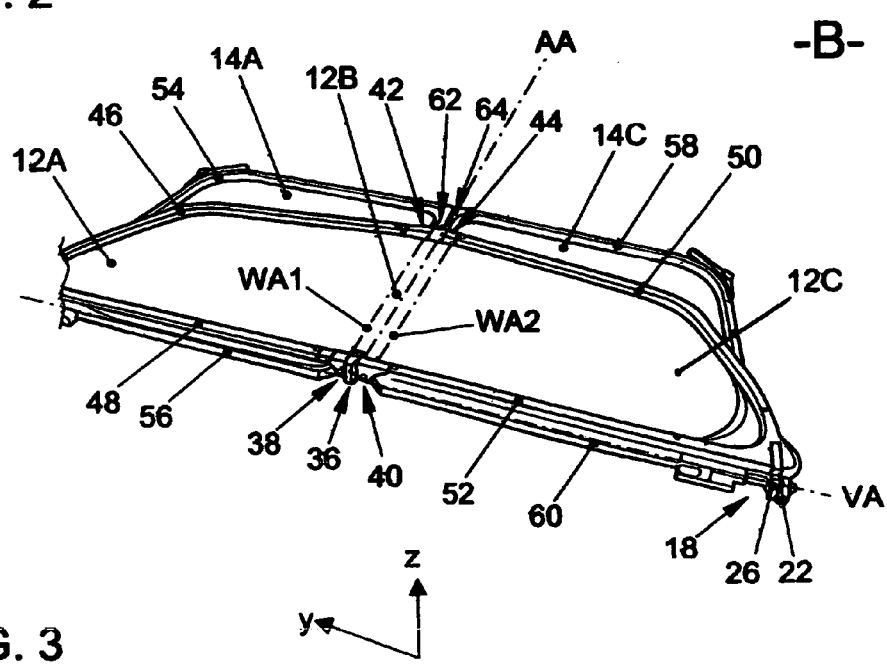
FIG. 3 is a diagrammatic perspective view of the wind stop device according to the invention in a covering position B.

After the first unfolding movement 32 of the wind partition 12 and of the cover partition 14 has been performed, the wind stop device 10 is in a covering position B according to FIG. 3. In this position, the wind stop device 10 is reversibly connected at its left and, respectively, at its right side at the chassis 16 with the fastening element of the connecting and fastening element 18. The chassis 16 is only schematically indicated by a line 16 in FIG. 4. FIG. 3 uses the same reference numerals as are used above and shows the wind stop device 10 in the covering position B wherein the triple hinge 36, 38, 40 is again shown in the region of a connection folding axis VA extending in the y-direction. The fourth and fifth pivot hinge 42, 44 are provided along the first and, respectively, second wind partition folding axis WA1, WA2, which are also shown here, at the upper edge of the wind partition. They form a double hinge at the wind partition part 12A, 12C. When in the covering position B, it can be clearly seen that the wind partition part 12 is formed by a left and a right wind partition part 12A, 12C and a middle wind partition part 12B. In other words, a wind stop device 10 is provided whose wind partition part 12 has a three-part structure or layout. The wind partition part 12 can be folded about a connection folding axis VA and can thus be folded from the covering position B shown here into a use position C by a second unfolding movement 34 in accordance with FIG. 4.

Further details of the structure of the wind stop device 10 can also be seen in FIG. 3. The left wind partition part 12A has a left upper wind partition frame part 46 and a left lower wind partition frame part 48. The right wind partition part 12C has a right upper wind partition frame part 50 and a right lower wind partition frame part 52. In an analogous manner, the left cover partition part 14A has a left upper cover partition frame part 54 and a left lower cover partition frame part 56. The right cover partition part 14C is formed by a right upper cover partition frame part 58 and a right lower cover partition frame part 60. In the region on the double hinge 42, 44 and of the triple hinge 36, 38, 40, the middle wind partition part 12B is formed by the joint-type or hinge-type linking of the left and right wind partition parts 12A, 12B to the middle wind partition part 12B, the linking extending as far as the cover partition folding axis AA.

In the region of the connecting and fastening elements 18, a connection between the wind partition 12 and the cover partition 14 is established in the outer region of the wind stop device 10, as is shown in FIG. 3. The first pivot hinge 36 establishes a connection between the wind partition 12 and the cover partition 14 in the region of the cover partition folding axis AA. The left lower wind partition frame part 48 and the left lower cover partition frame part 56 rest in the covering position such that they are parallel to one another and spaced from one another. The right lower wind partition frame part 52 and the right lower cover partition frame part 60 are disposed in an analogous manner on the right side. The right upper wind partition frame part 50 and the right upper cover partition frame part 58 as well as the left upper wind partition frame part 46 and the left upper cover partition frame part 54 do not rest directly on top of one another in the exemplary embodiment, however, this is due to the specific configuration of the wind stop device 10 of the exemplary embodiment that is described. A configuration having frame parts that rest directly on top of one another, such as frame parts 48, 56 or 52, 60, is conceivable.

The cover partition 14, respectively the left cover partition part and the right cover partition part 14A, 14C, furthermore form a left middle cover partition frame part 62 and a right middle cover partition frame part 64 along the cover partition folding axis AA. These cover partition frame parts 62, 64 are preferably configured as rectangular profiles such that, in the cover position B, abutting surfaces of the respective profile of the cover partition frame parts 62, 64 rest against each other. A further folding movement of the partition parts 14A, 14C, 12A, 12C upwards (z-direction) about the cover partition folding axis AA is not possible because the abutting surfaces of the cover partition frame parts 62, 64 rest against each other. This effect, the so-called self-holding effect or locking effect, achieves that the wind stop device 10 cannot sag downwards along the cover partition folding axis AA when it is in the cover position. The constructional layout of the corner profiles with respect to their stability is engineered by taking into account the weight of the cover partition parts and of the wind partition parts 12A, 12B, 12C which rest on the cover partition parts 14A, 14C.

Figure 4:
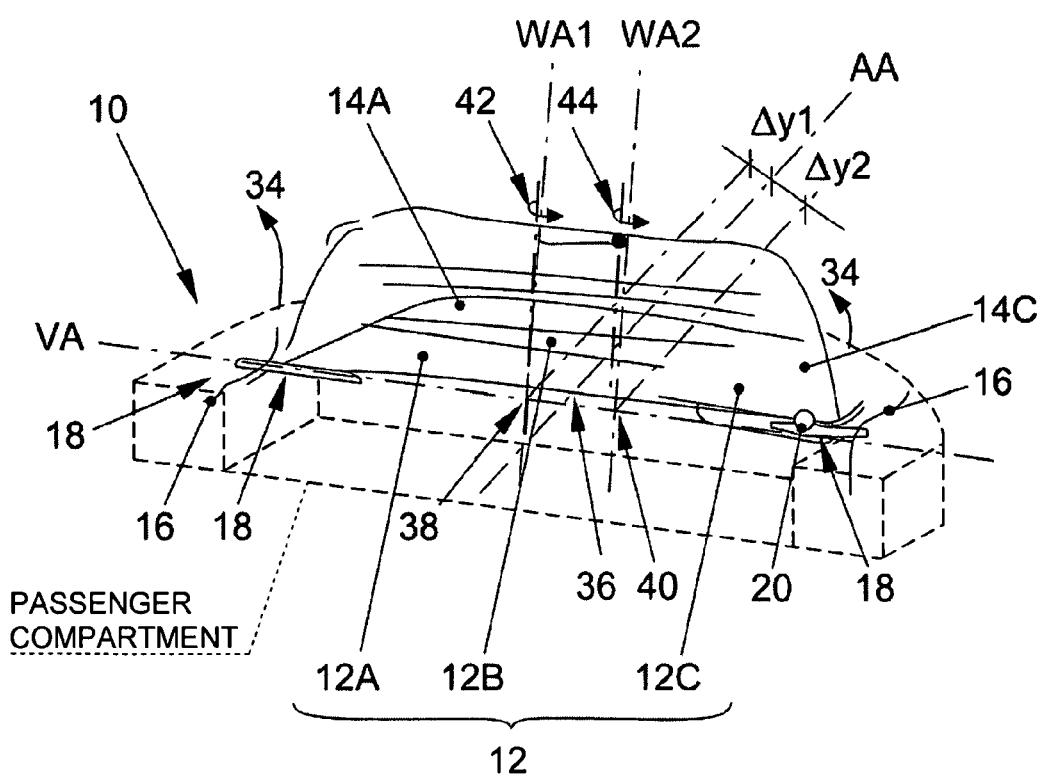
FIG. 4 is a diagrammatic perspective view of the wind stop device according to the invention in a use position C.

FIG. 4 shows a perspective view of a wind stop device 10 with the same structural elements and the same reference numerals in a use position C. By performing a second unfolding movement 34 about the connection folding axis VA, the wind partition parts 14A, 14C have been brought into a use position C. In addition to what is shown in FIGS. 1, 2 and 3, FIG. 4 furthermore schematically indicates the chassis 16 in which the wind stop device is fixed. In the use position, the bolts 20, which are disposed on both sides in the combined connecting and fastening elements 18, engage in the chassis 16. The further details shown in FIG. 4 correspond to what is shown in FIGS. 1 to 3.

Figure 5:
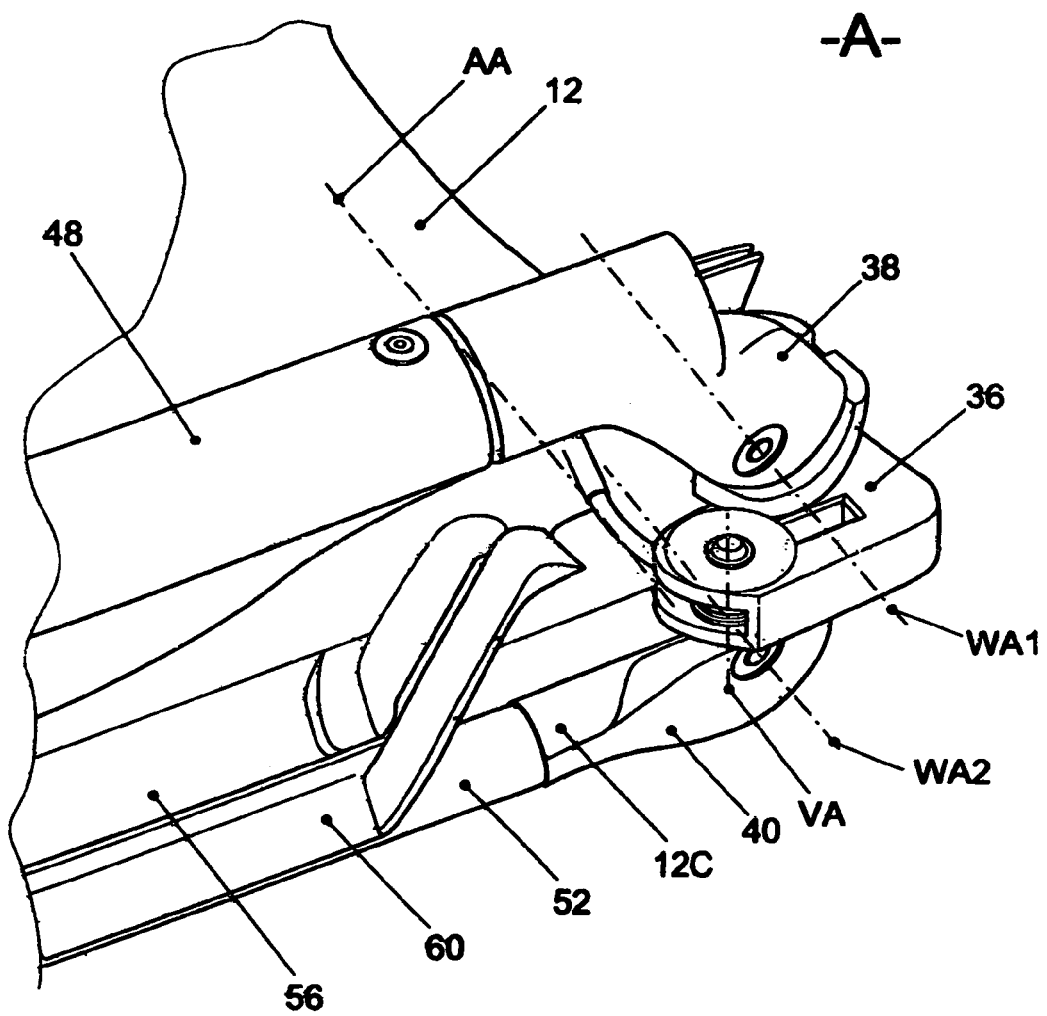
FIG. 5 is a perspective detail view of a hinge of the wind stop device according to the invention in the non-use position A.
Figure 6:
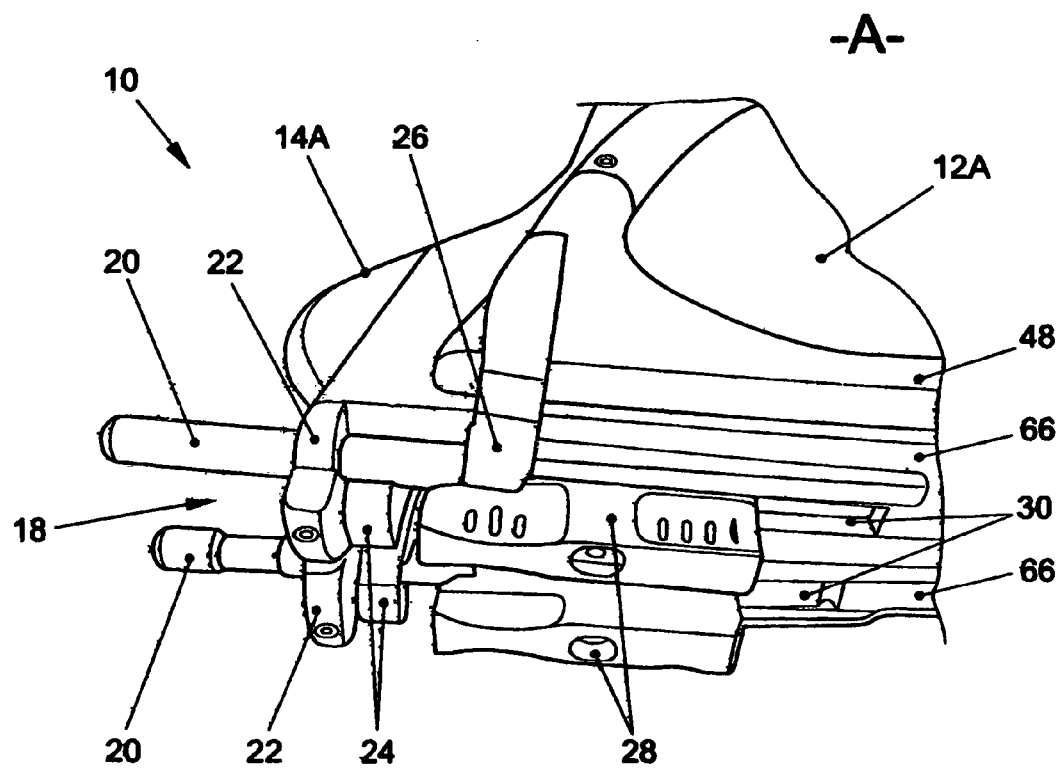
FIG. 6 is a perspective detail view of the connecting and fastening elements of the wind stop device accoring to the invention.

Finally, FIGS. 5 and 6 are views of details of the wind stop device 10 in the non-use position A that are described in detail below.

For a further illustration, an enlarged representation of the triple hinge 36, 38, 40 is shown in FIG. 5. The wind stop device 10 in FIG. 5 is in the non-use position A and rests folded up on a support, for example in a luggage compartment, wherein, when viewed from top to bottom, the left wind partition part 12A, the left cover partition part 14A, the right cover partition part 14C and the right wind partition part 12C are provided. The visible covers or linings between the frame parts of the wind stop device 10 belong to the left wind partition part 12A and to the right wind partition part 12C. Shown are, however, essentially the respective frame parts, the left lower wind partition frame part 48, the left lower cover partition frame part 56 as well as the right lower cover partition frame part 60 and the right lower wind partition frame part 52. The left and right lower cover partition frame parts 56, 60 are configured such that they project beyond the left and right lower wind partition frame parts 48, 52. FIG. 5 illustrates that the wind partition parts 12A, 12C are connected via the second and, respectively, third pivot hinge, 38, 40 to the first pivot hinge 36 to form the triple hinge. The cover partition parts 14A, 14C, which are surrounded by the wind partition parts 12A, 12C, are shown by the cover partition frame parts 56, 60 and extend between the wind partition parts 12A, 12C into the plane of paper of FIG. 5 and there they merge into the left and, respectively, right middle cover partition frame parts 62, 64 which are not visible in FIG. 5.

FIG. 5 further shows the orientation of the first and, respectively, second wind partition folding axis WA1, WA2 with respect to the cover partition folding axis AA. The connection folding axis VA extends through the pivot point of the first hinge 36 of the triple hinge and perpendicular to the wind partition folding axes WA1, WA2. The second unfolding movement 34 of the wind partition 12 with respect to the cover partition 14 occurs along this connection folding axis VA.

FIG. 6 shows a combination of a fastening and connecting element 18 for mounting the wind stop device 10 to the chassis. The wind stop device 10 is in this case in the same folding position in a non-use position as in FIG. 5, however, the side on the chassis is illustrated such that the left wind partition part 12A can be seen as an upper partition part and the left cover partition part 14A can be seen underneath. The left cover partition part 14A is formed somewhat bigger on the chassis side wherein this form or shape is dependent on the respective vehicle. The right wind partition part 12C and, respectively, the right cover partition part 14C are hidden in FIG. 6 and therefore cannot be seen in FIG. 6. However, the left lower wind partition frame part 48 of the left wind partition part 12A can be seen.

FIG. 6 shows a wind stop device 10 in the non-use position A. In this position, the respective connecting and fastening elements 18 rest on top of one another. The connecting and fastening elements 18 respectively have a bolt 20 which engages in a connecting element 66 which is formed as a sleeve-type element. The bolt 20 reaches through a guide 22, which is attached at the left cover partition part 14A or, respectively, at the right cover partition part 14C. The bolt 20 also reaches through an eye 26 which is connected to the left wind partition part 12A or, respectively, to the right wind partition part 12C. By using this configuration of guides 22 and eyes 26, the respective left and right cover partition parts and wind partition parts 14A, 12A and, respectively, 14C, 12C are movably connected via the bolt 20. This achieves that the left and right cover partition parts and wind partition parts 14A, 12A and, respectively, 14C, 12C can slide along the respective bolt 20 during the first unfolding movement 32 about the wind partition folding axes WA1, WA2 and, respectively, about the cover partition folding axis AA and thus sufficient play and mobility for the folding is provided.

In the non-use position A illustrated in FIG. 6 the bolt 20 normally occupies a position in which it is arranged such that it is essentially entirely inserted in the connecting element 66. For illustration purposes it is shown in a position when it is pulled out. The bolts 20 reach the inserted position, which is normally present in the non-use position A, by an actuating element 28 which allows a shifting of the bolt 20, wherein the actuating element has a spring element provided behind the respective actuating element 28, which spring element is provided between the connecting element 66 and the actuating element 28. By actuating the actuating element 28 to the right (in a non-locking position), a nose, which is provided in a direction toward the mount 30, engages on the rear side of the respective actuating element 28 in the respective mount 30 wherein the bolt 20 is moved along and the spring element is relaxed. In order to allow an easy actuation to the right (in the non-locking position) or inwards in the covering position B, the actuating element 28 has an outer latch curvature which, in FIG. 6, is respectively provided on the left side on the actuating element 28. When this non-use position has been reached, the wind stop device 10 is in a complete non-use position A with the actuating element 28 respectively latched towards the right in the mount 30 and the bolts 20 projecting not substantially beyond the left edge of the left and, respectively, right cover partition part 14A, 14C.

If the wind stop device 10 is to be brought again from the non-use position A via the cover position B into the use position C, the bolts 20 have to be brought, already in the covering position B or once in the use position C when the wind partition is already erected, from the above-described non-use position A for anchoring the wind stop device 10 in the chassis 16 into their extended position, the latching position. At first, during the first folding movement 32 from the non-use position A to the covering position B, the eyes 26 shift on the respective bolt 20, respectively to the left when starting with was is illustrated in FIG. 6 or, when the covering position (see FIG. 3) is reached, outwards in a direction of the guides 22 such that in the covering position B the respective eye 26 comes to rest on the guide 22 as is shown on FIG. 3.

The wind partition 12 can now already for example be raised into the vertical position such the use position C is reached. In both positions B and C the wind stop device 10 can now be connected to the chassis 16 in the following manner. The actuating element 28 is unlatched from the mount 30 by a forceful actuation, in the exemplary embodiment when the wind stop device already rests in a mounting situation by pulling in the driving direction against the tensioning spring element, as a result of which the respective bolt 20 can be pushed within the connecting element 66 and the guides 22, in a direction transverse to the driving direction, into the chassis 16.

The respective actuating element 28 (see FIG. 6) includes for this purpose in addition to the inner latch curvature for latching, in particular for pushing the bolt 20 into the chassis 16, an outer latch curvature for unlatching the bolt 20 from the chassis. In order to transfer the respective bolt 20 into the latching position, the respective actuating element 28 has to be pushed outwards after pulling it into the driving direction whereby the bolt 10 latches into the chassis.

In the final latching position the actuating element 28 grips, if applicable, at least partially over a spring element 24, preferably a leaf spring. This leaf spring 24 presses the respective bolt 20 in a direction of the eye 26 which is respectively situated over the spring leaf when the covering position B is reached and which has already moved, as described above, from the non-use position A in the covering position B in the direction of the guides 22. If the wind partition part 12 is then folded upwards into a vertical position, then the adjustment of the wind partition part 12 in its vertical use position C is made possible in that a latch contour is incorporated in each eye 26 such that the wind partition part 12 latches into the latch contour when it is transferred from the covering position B to the use position C. By pressing the wind partition part 12 in a direction against the driving direction from the use position C into the covering position B, the respective eye 26 is again rotated about the bolt 20 and is guided, against the spring leaf 24, out of the latch contour inside the eye 26. This application claims the priority benefits, under 35 U.S.C. § 119, of German patent application No. 10 2004 061 758.9, filed Dec. 22, 2004; the entire disclosure of this prior application is herewith incorporated by reference.

LIST OF REFERENCE NUMERALS

10 wind stop device
12 wind partition
12A left wind partition part
12B middle wind partition part
12C right wind partition part
14 cover partition
14A left cover partition part
14C right cover partition part
16 chassis
18 connecting and fastening element
20 bolt
22 guides
24 spring element
26 eye
28 actuating element
30 mount
32 first unfolding movement
34 second unfolding movement
36 first pivot hinge
38 second pivot hinge
40 third pivot hinge
42 fourth pivot hinge
44 fifth pivot hinge
46 left upper wind partition frame part
48 left lower wind partition frame part
50 right upper wind partition frame part
52 right lower wind partition frame part
54 left upper cover partition frame part
56 left lower cover partition frame part
58 right upper cover partition frame part
60 right lower cover partition frame part
62 left middle cover partition frame part
64 right middle cover partition frame part
66 connecting element
A non-use position
B covering position
C use position
WA wind partition folding axis
WA1 first wind partition folding axis
WA2 second wind partition folding axis
AA cover partition folding axis
VA connection folding axis
$\Delta y$ distance between wind partition folding axes
$\Delta y1$ first wind partition folding axes distance
$\Delta y2$ second wind partition folding axes distance

I claim:

1. A wind stop device, comprising:
a multi-part wind partition having wind partition parts including a left wind partition part, a right wind partition part, and a middle wind partition part;
a multi-part cover partition having cover partition parts including a left cover partition part and a right cover partition part;
said multi-part wind partition defining a first wind partition folding axis and a second wind partition folding axis, said middle wind partition part being provided between said first wind partition folding axis and said second wind partition folding axis;
said multi-part cover partition defining a cover partition folding axis;
said left cover partition part and said right cover partition part being foldable about said cover partition folding axis and simultaneously said left wind partition part being foldable about said first wind partition folding axis and said right wind partition part being foldable about said second wind partition folding axis from a non-use position into a covering position;
said wind partition parts and said cover partition parts being in a folded-up position and substantially resting against one another when in the non-use position and being configured to substantially horizontally cover a portion of a passenger compartment when in the covering position; and
said wind partition parts defining a connection folding axis transverse to a direction of travel, said left wind partition part, said right wind partition part, and said middle wind partition part being foldable from the covering position into a use position by folding said left wind partition part, said right wind partition part, and said middle wind partition part together about said connection folding axis such that said wind partition parts are substantially perpendicular with respect to said cover partition parts, at least one of said wind partition parts and said cover partition parts being configured to be connected to a chassis when in the use position.

2. The wind stop device according to claim 1, wherein said wind partition parts surround said cover partition parts when said wind partition parts and said cover partition parts are in the non-use position.

3. The wind stop device according to claim 1, including:
a first hinge, a second hinge, a third hinge, a fourth hinge, and a fifth hinge;
said first hinge, said second hinge, and said third hinge together forming a triple hinge;
said second hinge and said fourth hinge being provided for folding said left wind partition part from the non-use position to the covering position about said first wind partition folding axis; and
said third hinge and said fifth hinge being provided for folding said right wind partition part from the non-use position to the covering position about said second wind partition folding axis.

4. The wind stop device according to claim 3, wherein said first, second, third, fourth and fifth hinge are pivot hinges.

5. The wind stop device according to claim 1, including:
a triple hinge including a first hinge, a second hinge, and a third hinge; and
said first hinge being provided for folding said left wind partition part, said right wind partition part, and said middle wind partition part together about said connection folding axis.

6. The wind stop device according to claim 1, wherein:
said left cover partition part has left cover partition frame parts including a left middle cover partition frame part;
said right cover partition part has right cover partition frame parts including a right middle cover partition frame part; and
said left middle cover partition frame part and said right middle cover partition frame part are formed as corner profiles with respective surfaces facing one another and substantially resting against one another in the covering position and in the use position such that said corner profiles provide a self-holding effect for the left cover partition part and the right cover partition part along the cover partition folding axis.

7. The wind stop device according to claim 1, wherein said left wind partition part includes left wind partition frame parts and said right wind partition part includes right wind partition frame parts.

8. The wind stop device according to claim 3, wherein said middle wind partition part is bounded by said first wind partition folding axis, said second wind partition folding axis, said second hinge, said third hinge, said fourth hinge, and said fifth hinge.

9. The wind stop device according to claim 1, including:
a left connecting and fastening element and a right connecting and fastening element foldably connecting said multi-part wind partition and said multi-part cover partition to one another when in the non-use position, in the covering position, and in the use position;
said left connecting and fastening element and said right connecting and fastening element being configured to connect at least one of said multi-part wind partition and said multi-part cover partition to the chassis when in the covering position and in the use position; and
said left connecting and fastening element and said right connecting and fastening element each having a bolt, a guide, a spring element, an eye, an actuating element, and a mount for said actuating element.

10. The wind stop device according to claim 9, wherein:
said left connecting and fastening element and said right connecting and fastening element each further have a connecting element;
said left cover partition part has a left lower cover partition frame part and said right cover partition part has a right lower cover partition frame part; and
said bolt is guided in said guide, in said eye, and in said connecting element substantially in extension of said left lower cover partition frame part and, respectively, in extension of said right lower cover partition frame part.

11. The wind stop device according to claim 9, wherein:
said left cover partition part and said right cover partition part each have a respective lower cover partition frame part; and
said guide is connected to said lower cover partition frame part.

12. The wind stop device according to claim 9, wherein:
said left cover partition part and said right cover partition part each have a respective lower cover partition frame part; and
said eye is connected to said lower cover partition frame part.

13. In combination with a convertible having a chassis with a passenger compartment, a wind stop device, comprising:
a multi-part wind partition having wind partition parts including a left wind partition part, a right wind partition part, and a middle wind partition part;
a multi-part cover partition having cover partition parts including a left cover partition part and a right cover partition part;
said multi-part wind partition defining a first wind partition folding axis and a second wind partition folding axis, said middle wind partition part being provided between said first wind partition folding axis and said second wind partition folding axis;
said multi-part cover partition defining a cover partition folding axis;
said left cover partition part and said right cover partition part being foldable about said cover partition folding axis and simultaneously said left wind partition part being foldable about said first wind partition folding axis and said right wind partition part being foldable about said second wind partition folding axis from a non-use position into a covering position;
said wind partition parts and said cover partition parts being in a folded-up position and substantially resting against one another when in the non-use position and being configured to substantially horizontally cover a portion of the passenger compartment when in the covering position; and
said wind partition parts defining a connection folding axis transverse to a direction of travel of the convertible, said left wind partition part, said right wind partition part, and said middle wind partition part being foldable from the covering position into a use position by folding said left wind partition part, said right wind partition part, and said middle wind partition part together about said connection folding axis such that said wind partition parts are substantially perpendicular with respect to said cover partition parts, at least one of said wind partition parts and said cover partition parts being configured to be connected to the chassis when in the use position.

* * * * *